United States Patent [19]

Adams et al.

[11] Patent Number: 4,724,948

[45] Date of Patent: Feb. 16, 1988

[54] AUTOMATIC CLAMPING AND UNCLAMPING SYSTEM

[75] Inventors: John L. Adams, Sinking Spring; Dennis L. Miller, Ephrata, both of Pa.

[73] Assignee: RCA Corporation, Princeton, N.J.

[21] Appl. No.: 884,526

[22] Filed: Jul. 11, 1986

[51] Int. Cl.⁴ .............................................. B65G 37/00
[52] U.S. Cl. .................................. 198/474.1; 198/802; 198/803.7
[58] Field of Search ................. 198/474.1, 476.1, 802, 198/803.7, 346.2, 470.1, 803.1, 465.1, 358, 341, 346.1; 414/222

[56] References Cited

U.S. PATENT DOCUMENTS

| | | |
|---|---|---|
| 2,532,315 | 12/1950 | Johnson et al. |
| 2,564,839 | 8/1951 | Giacchetti |
| 3,545,933 | 12/1970 | Podschadly et al. ......... 198/346.1 X |
| 3,871,511 | 3/1975 | Wentz et al. ..................... 198/358 |
| 4,306,646 | 12/1981 | Magni ............................. 198/341 |
| 4,312,110 | 1/1982 | Averyanov et al. ............. 198/346.1 |
| 4,326,624 | 4/1982 | Ewertowski et al. ........... 198/346.1 |
| 4,557,371 | 12/1985 | Yonezawa ..................... 198/803.01 |
| 4,565,480 | 1/1986 | Merk et al. .................... 198/465.1 |
| 4,637,108 | 1/1987 | Murata et al. ............... 198/465.1 X |

Primary Examiner—L. J. Paperner
Assistant Examiner—Cheryl L. Gastineau
Attorney, Agent, or Firm—E. M. Whitacre; D. H. Irlbeck; L. L. Hallacher

[57] ABSTRACT

A system for automatically clamping and unclamping objects into a carrousel having a plurality of incrementally movable carriers which support slidable trays, includes arms for unclamping a slide preventing detent and a foot for gripping the trays and sliding the trays away from the carrousel. An unclamping mechanism unclamps the objects so they can be removed form the trays. The tray is incremented to an unloaded position and a probe verifies the absence of an object. The tray then increments to a load position where another object is loaded into the tray and the clamps are automatically closed.

8 Claims, 5 Drawing Figures

AUTOMATIC CLAMPING AND UNCLAMPING SYSTEM

BACKGROUND

This invention relates generally to automatic clamping and unclamping systems and particularly to a system for automatically clamping and unclamping kinescopes on a carrousel test conveyor.

Automation of the production of many products is rapidly increasing and is occurring at all phases of production. Thus, the actual production steps, many test procedures, and the handling of the product between production and test steps are all being automated. Automation of product handling between processing and/or test operations is desirable in order to eliminate high cost labor to perform mundane jobs, and also because the automatic conveyance of product between processing or test steps typically is more rapid, consistent and less damaging to the product.

The automatic of the conveyance of objects between processing or testing stages requires that the objects be moved from one point to another point accurately and rapidly. Such automation also frequently requires that the objects be fixedly set into, and removed from, particular types of fixtures automatically. The invention, therefore, is directed to a system for automatically clamping and unclamping objects, such as kinescopes, into the carriages of a carrousel type of test set.

SUMMARY

A system for automatically clamping and unclamping objects onto slidable trays arranged on the incrementally moving carriers of a carrousel. The trays move to various test positions and to various load and unload positions of the carrousel. Each of the trays has a clamp means for clamping objects onto the trays, and detent means for preventing sliding of the trays on the carriers. A tray sliding means which is arranged at a first unload position, includes means for actuating the detent means to permit sliding of the trays, and gripping means for gripping the trays and sliding the trays from an inward position to an outward position. An unclamping means is arranged at a second unload position, and includes means for unclamping the clamp means to permit unloading of the objects from the trays. An unloaded position includes means for verifying the absence of an object from the trays. A clamping means is arranged at a load position, and includes means for clamping the objects onto the trays prior to the trays being incremented to the test positions.

BRIEF DESCRIPTIONS OF THE DRAWINGS

DETAILED DESCRIPTION

Figure 1:
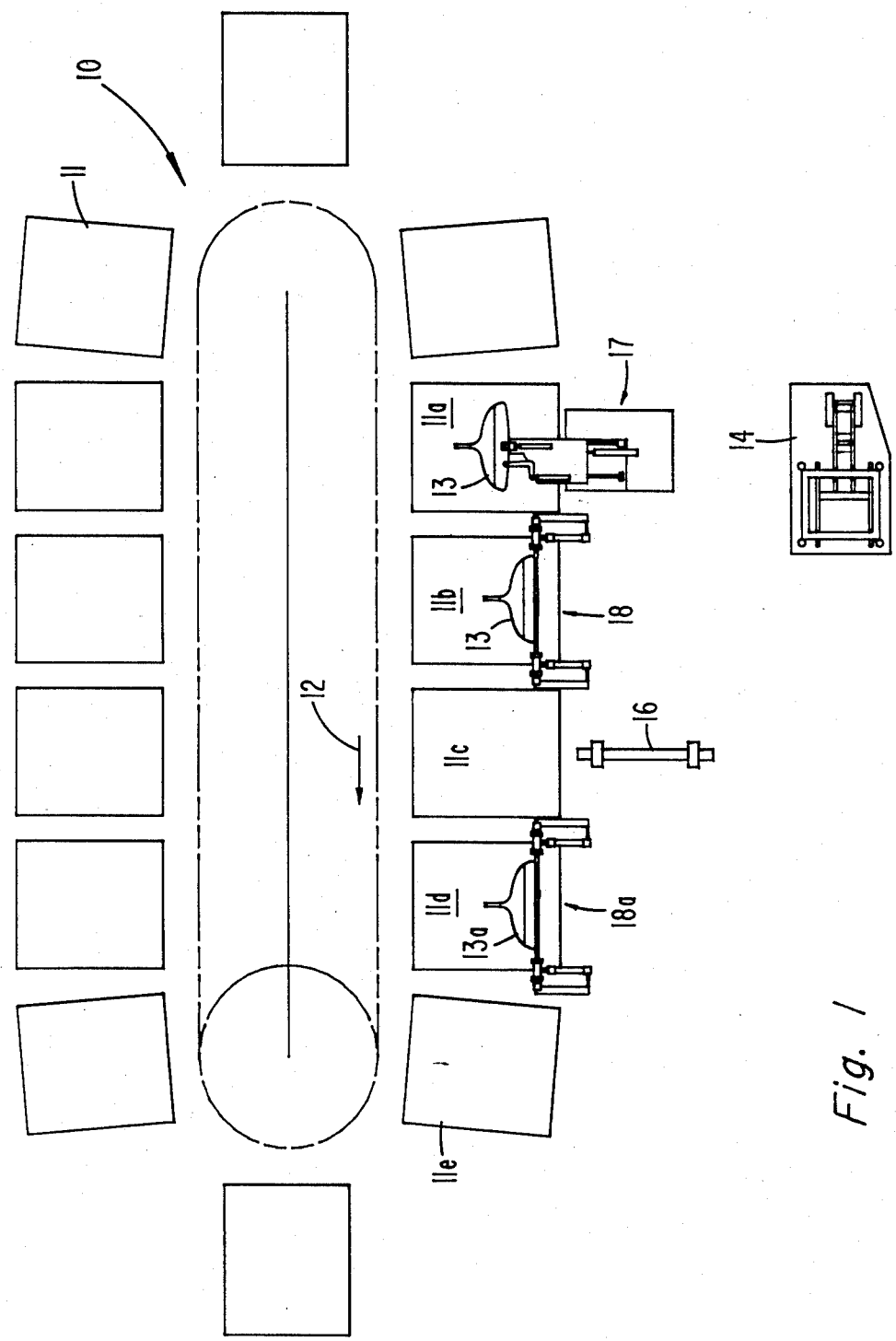
FIG. 1 is a simplified showing of a carrousel test station incorporating a preferred embodiment.

In FIG. 1, a carrousel type test station 10 includes a plurality of carriers 11 which are moved incrementally about the carrousel as indicated by the arrow 12. As the carriers 11 are incremented to the various positions, any desired test or production steps can be performed on the objects supported on the carriers 11. Carrousels of this type for the production and testing of products are well known to those skilled in the art.

Figure 2:
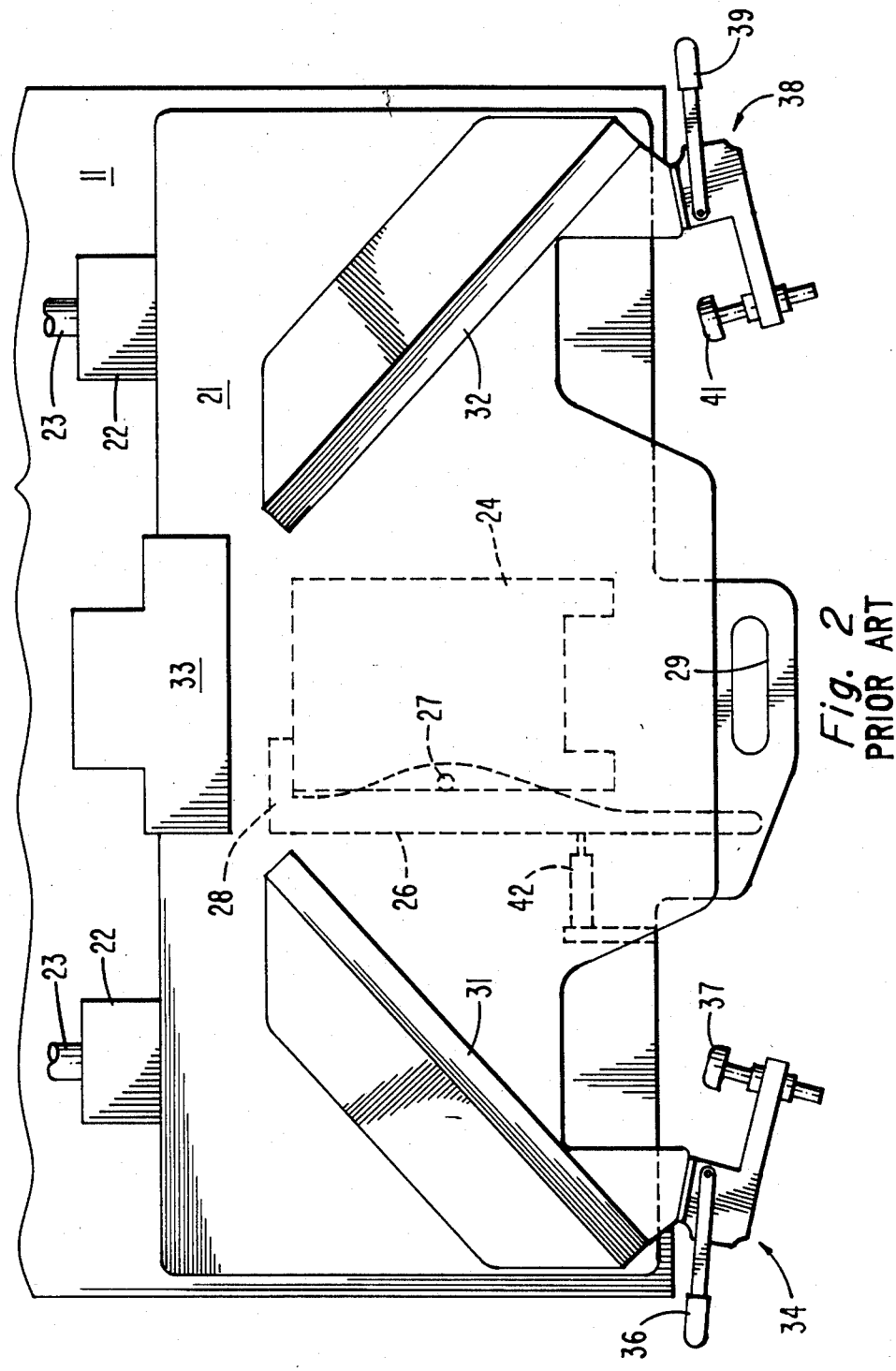
FIG. 2 shows a prior art carrier and slidable tray of the carrousel of FIG. 1 in more detail.
Figure 3:
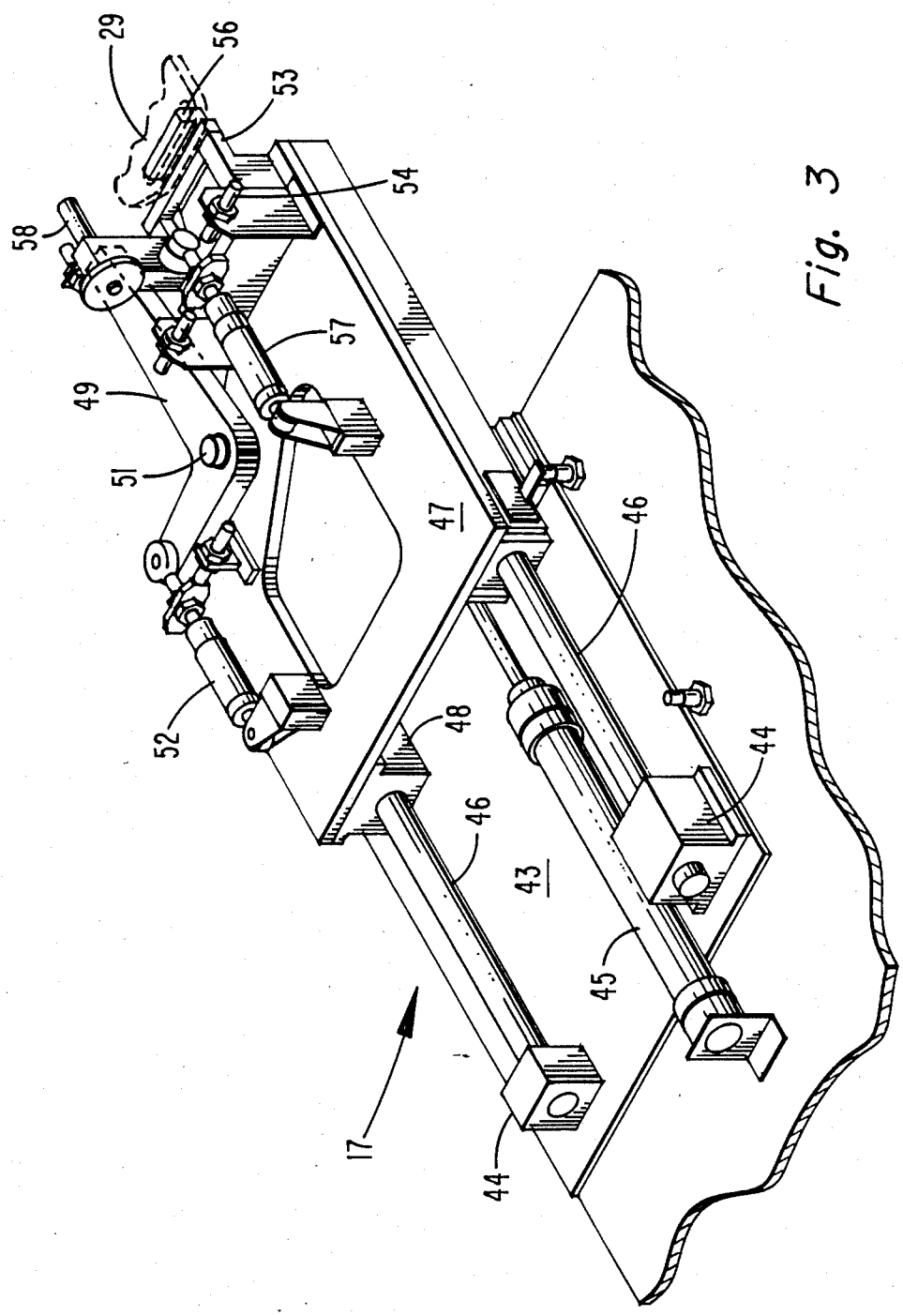
FIG. 3 is an isometric of a mechanism for undetenting and sliding the slidable tray of FIG. 2.
Figure 4:
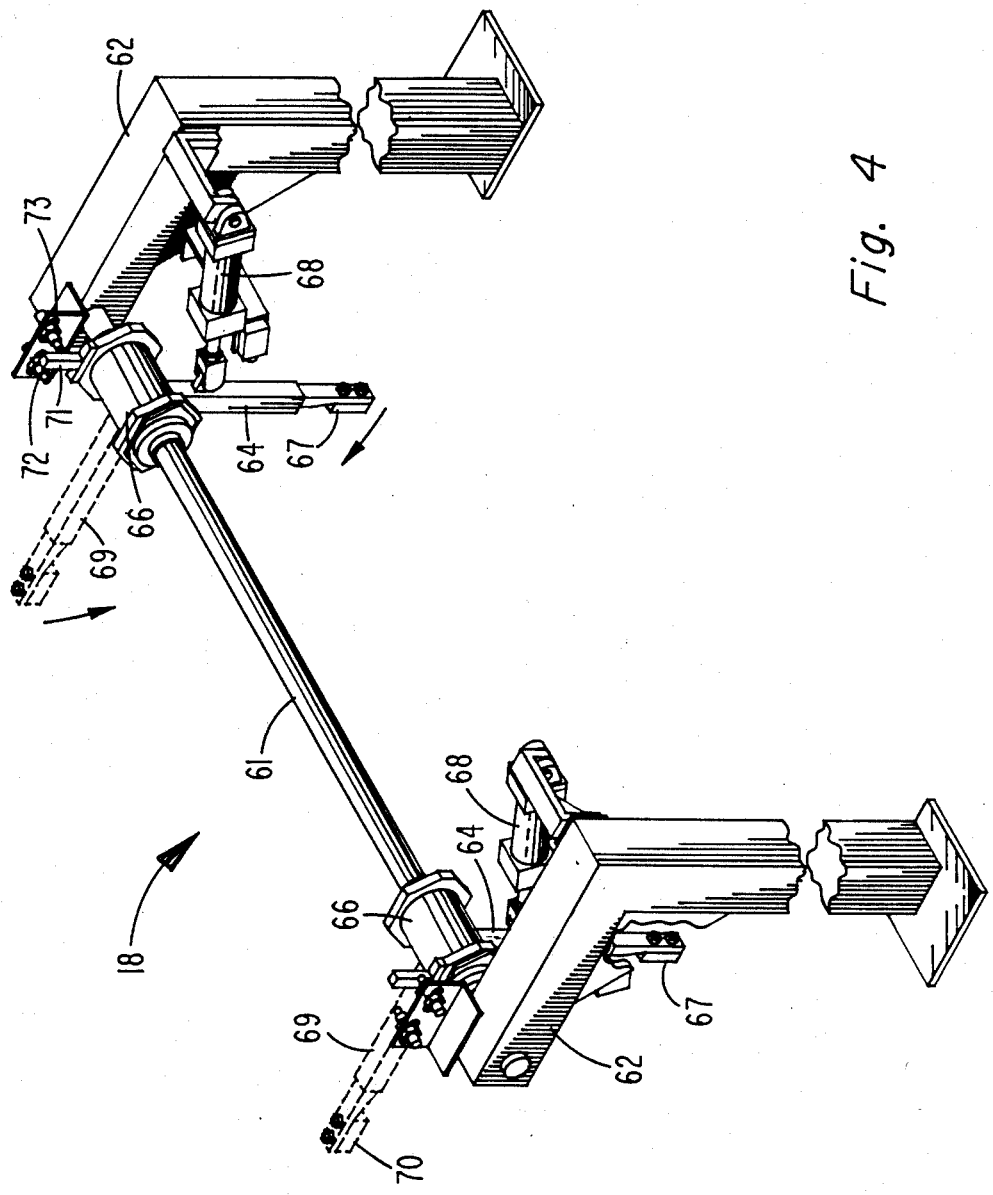
FIG. 4 is a isometric of clamp means and an unclamp means.

The carrousel 10 is used to convey kinescopes 13 to various test positions as the carriers are incrementally moved about the carrousel 10. Accordingly, after the testing is completed, the carriers 11 reach a first unload position 11a where the unloading of the kinescopes 13 from the carriers 11 is to be initiated. At the position 11a a tray mechanism, which forms a part of the carrier 11 and is shown in FIG. 2, in undetented and the kinescope 13 is slid outwardly away from the center of the carrousel by a tray sliding mechanism 17 (FIG. 3). The carrier 11 is then incremented to a second unload position 11b where clamp members which hold the kinescope 13 on the carrier 11 ar unclamped by an unclamping mechanism 18 (FIG. 4). The kinescope 13 is then either automatically or manually removed from the carrier 11 and can be transferred to the proximity of a printer support 14 (FIGS. 1 and 5) where a printing mechanism applies an identification tag to the kinescope. The carrier 11 is then incremented to an unloaded position 11c where a probe 16, of known type, is moved inwardly toward the carrousel to verify that the carrier 11c is empty. The carrier 11 is next incremented to a load position 11d where a probe 16, of known type, is moved inwardly toward the carrousel to verify that the carrier 11c is empty. The carrier 11 is next incremented to a load position 11d where another kinescope 13a is loaded and automatically clamped, by a clamping mechanism 18a, onto the tray of the carrier 11. The carrier is then incremented to a position 11e and the kinescope is ready to be incrementally moved to the various stations about the carrousel where the various tests are performed.

FIG. 2 shows the carrier 11 in more detail. The carrier includes a slidable tray 21 which is fixed to the carrier 11 by slide bearing 22 and slide rods 23 in known manner. The rods 23 are fixed to the carrier 11 by fixed supports (not shown) so that the slide bearings 22 and thus the tray 17, are free to slide on the rods 23. A detent member 24 is fixed to the top surface of the carrier 11. A detent means 26, such as a lever, is pivotally attached to the bottom of the slidable tray 17 at a pivot point 27. A foot 28 of the lever 26 engages the fixed detent 24 to prevent the tray 17 from sliding with respect to the carrier 11. The tray 21 includes a slot 29 which is engaged by a gripper of the tray sliding means 17 to slide the tray outwardly away from the center of the carrousel 10.

Kinescope mounting support members 31 and 32 are fixed to the top surface of the tray 21 and are angularly disposed in accordance with the angle of the funnel of the kinescope being tested. The neck of the kinescope rests in a mounting member 33 to support the Z axis of the kinescope in a substantially horizontal position with the viewing screen substantially perpendicular to the plane of the tray 21. A dead over center clamp 34, of known type, includes an operating handle 36 and a resilient retaining member 37 is positioned to clamp one side of the kinescope. A similar clamp 38, having a handle 39 and a resilient retaining member 41, is arranged in the proximity of the other side of the tray 11. When the handles 36 and 39 are moved inwardly toward the tray 21 the resilient retaining members 37 and 41 engage the viewing screen of the kinescope and firmly bias the kinescope against the support members 31 and 32 and snugly retain the kinescope on the tray 21. Similarly, when the handles 36 and 39 are moved outwardly from the tray 11, the clamps 34 and 38 are released to permit the removal of the kinescope from the tray 21. The automatic clamping and unclamping of the clamps 34 and 38 is affected by the mechanism 18 shown in detail in FIG. 4. The tray 21 includes a spring 42 which biases the lever 26 against the detent member 24 to prvent the tray 21 from sliding.

In FIG. 3, the tray sliding mechanism 17 includes a fixed plate 43. Support blocks 44 are affixed to the fixed plate 43 and support slide rods 46. A support plate 47 slides on the rods 46 by way of slide bearings 48. This sliding arrangement is substantially identical to the sliding arrangement of the tray 21 on the carrier 11 in FIG. 2. The shaft of a cylinder 45 is coupled to the support plate 47 to effect sliding of the support plate 47. An actuating means 49 is pivotally supported on the sliding plate 47 and at a pivot point 51. The actuating means 49 is in the form of an L-shaped lever one end of which is pivotally coupled to a cylinder 52 which causes the lever 49 to rotate about the pivot point 51. Upon acutation, the lever 49 engages the detent lever 26 of FIG. 2 to cause the lever 26 to rotate counterclockwise to disengage the detent end 28 of the lever 26 from the fixed detent 24. A gripping means 53, in the form of an L-shaped member, has a long leg pivoted about a horizontal shaft 54. The foot 56 of the L-shaped member faces upwardly. The L-shaped member 56 is pivoted by a cylinder 57 to cause the foot 56 to pivot from a lower rest position to a raised engaging position to engage the slot 29 (FIG. 2). An object sensor 58 is affixed to the slidable support 47 and used to detect the presence of an object on the tray prior to actuating the device.

In operation, the tray sliding mechanism 17 normally is in the closed position with the slide bearings 48 resting against the support blocks 44. The cylinder 45 is actuated to extend the shaft and move the slidable support plate 47 toward the tray 21 and the object mounted thereon. When an object is mounted on the slidable tray 21 (FIG. 2) the proximity detector 58 detects the presence of the object. The cylinder 57 is actuated to rotate the foot 56 of the L-shaped gripper 53 upwardly into engagement with the slot 29 (FIG. 2) of the slidable tray 21. The cylinder 52 is actuated to rotate the L-shaped lever 49 into engagement with the lever 26 (FIG. 2) to free the lever 26 from the fixed detent member 24. The cylinder 45 is actuated to retract the shaft and slide the slidable tray 21 outwardly away from the center of the carrousel 10 (FIG. 1). The gripper 53 is returned to the original position and the carrousel is then incremented one step to position 11b of FIG. 1.

The clamping mechanism 18a and unclamping mechanism 18 are shown in detail in FIG. 4. The clamping mechanism 18a includes a shaft 61, which is supported by mounting brackets 62. The mechanism 18a includes actuating arms 64, which are spaced to individually engage the handles 36 and 39 of the clamps 34 and 38 (FIG. 2). The actuating arms 64 extend downwardly from the shaft 61 when in the home position and are rotatably coupled to the shaft 61 by mounting bearings 66. This arrangement of the actuating arms 64 allows the mechanism 18a to serve as the clamping means used at the load positon 11d (FIG. 1). Each of the actuating arms 64 includes a pad 67 to engage the handles 36 and 39 to close the clamps 34 and 38. Acutating cylinders 68 are simultaneously energized and are pivotally coupled to the actuating arms 64 to cause the arms to rotate into position against the handles and clamp an object into the slidable tray, as required at position 11d of FIG. 1.

The unclamping mechanism 18 required at position 11b (FIG. 1) also is shown in FIG. 4 and is substantially identical to that of the clamping mechanism used at position 11d except for the initial positioning, and direction of rotation of the actuating arms. In the unclamping configuration of the mechanism 18, the actuating arms 69 extend upwardly away from the shaft 61, as shown in phantom. The elevated positioning of the actuating arms is required to permit the objects mounted on the trays 21 to pass beneath the arms. Each of the actuating arms 69 includes a pad 70 on one end to engage the handles of the clamps 36 and 39 (FIG. 2). Thus unclamping an object from the slidable tray 21 requires the actuating arms 69 to rotate through a larger angle than that required for clamping. Accordingly, the cylinders which rotate the arms have a longer stroke for the unclamping operation than for the clamping operation. Each of the bearings 66 supports a switch actuator 71 arranged between proximity switches 72 and 73 to verify that the proper clamping or unclamping action has occurred prior to any effort to increment the carrousel 10 to the next position.

Figure 5:
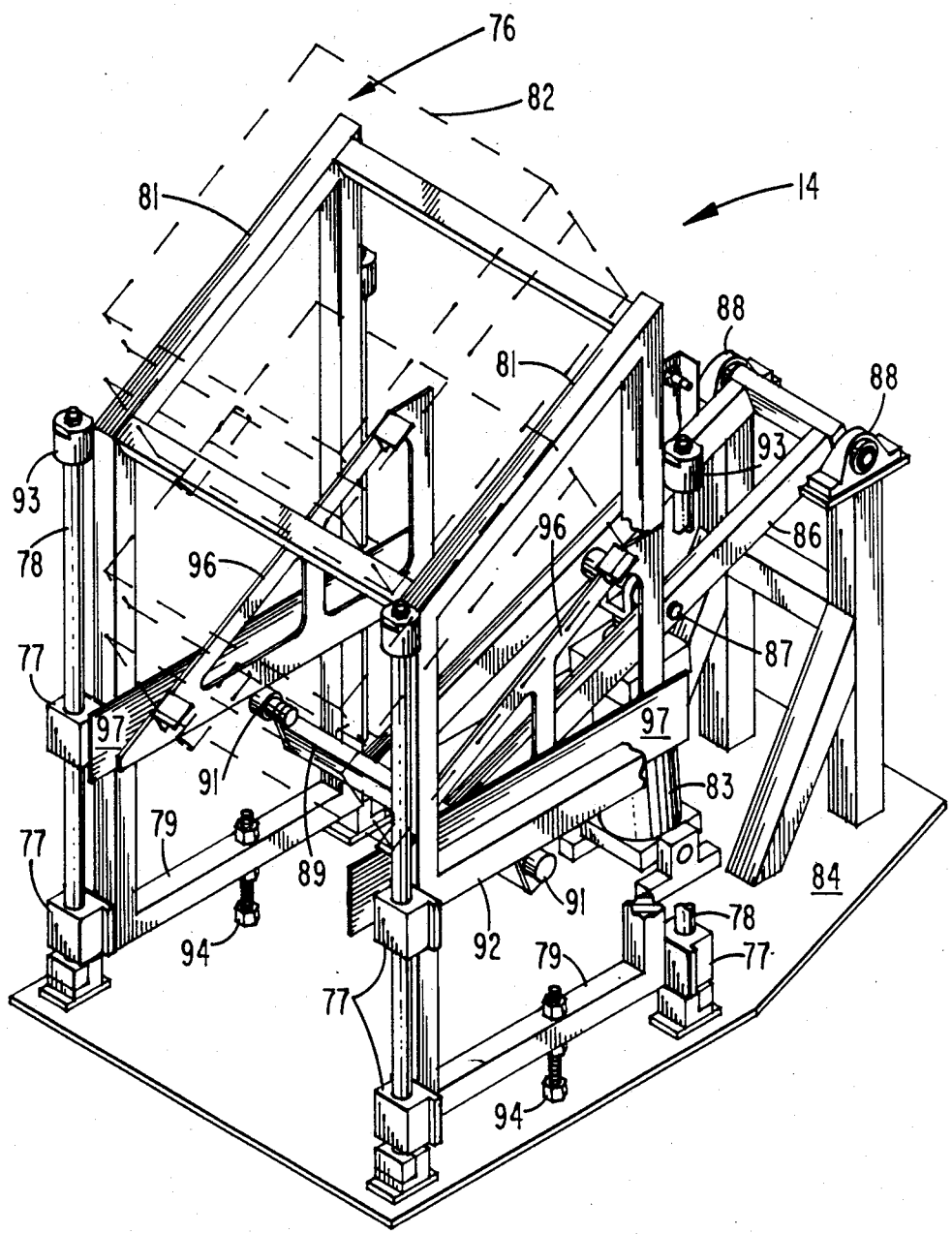
FIG. 5 is an isometric of the means for supporting identification tag printers in the proximity of the carrousel of FIG. 1.

In FIG. 5, the printer support 14 includes a vertically movable rack 76. The rack includes slide bearings 77 which are arranged to slide on four vertical slide rods 78. The slidable rack 76 includes substantially horizontal bottom bars 79 and sloped top bars 81. The sloped top bars 81 are used to support a commercially available printer 82, shown in phantom, which is used to print and apply a label to an object being unloaded from the second unload station 11b of FIG. 1.

A cylinder 83 is pivotally supported on a base plate 84 of the printer support mechanism 14. The shaft of the cylinder 83 is pivotably coupled to a pivotable frame 86 by a pivot shaft 87. The pivotable frame 86 is pivotably supported above the base plate 84 by bearings 88. The distal end of the pivotal frame 86 supports a shaft 89 and two rollers 91. Rollers 91 engage upper horizontal members 92 of the vertically slidable rack 76. The slidable rack 76 is raised by extending the shaft of the cylinder 83 to cause the rollers 91 to move upwardly and act against the upper horizontal support members 92 to elevate the frame. The height of the rack 76 motion is adjustable by adjustable stops 93 which are arranged at the tops of the vertical rods 78. The lower position of the vertically movable frame 76 is adjustable by adjustable bottom stops 94.

A second slanted support surface is established by angular members 96 which are arranged to slide on additional horizontal members 97. The horizontal members 97 and thus also the angular member 96, are coupled to the upper horizontal support members 92 in the same manner as the well-known slide mechanism of a desk drawer to permit the lower tilted surface 96 to be horizontally moved toward the bearings 88. This motion permits the servicing of a second printer 82 also shown in phantom, which rests on the angular members 96.

The printer support 14 is highly advantageous because two printers are simultaneously supported on the vertically movable rack 76. Typically, the upper printer is in operation to apply identification tape to articles being unloaded from the carrousel 10 of FIG. 1. However, when the printer in operation is in need of service or runs out of paper or ink, the cylinder 83 is actuated to rise the vertically movable rack 76 to position the spare printer for operation without the loss of operating time of the carrousel 10. After the upper printer is serviced and replaced, the lower printer can continue operating until it needs servicing. At that time, the vertically slidable rack 76 is lowered to place the upper printer in the operational position. The horizontal movement capability of the lower rack is utilized to horizontally relocate the lower printer for servicing while the upper printer remains in operation.

What is claimed is:

1. A system for automatically clamping and unclamping objects onto slidable trays arranged on the carriers of a carrousel, said carriers incrementally moving to various operating positions and to various load and unload positions of said carrousel for automatically clamping and unclamping said objects in response to said carriers incrementally moving to said various positions, each of said trays having at least one clamp for clamping said objects onto said trays, and detent means for preventing sliding of said trays on said carriers, said system comprising:

a tray sliding means arranged at a first unload position along said carrousel, said tray sliding means including means for actuating said detent means to permit sliding of said trays, said means for actuating including a pivotable arm for disengaging said detent means from engagement with said carrier, and means for engaging said trays and sliding said trays from an inward position to an outward position, said tray sliding means also including means for pivoting, said means for engaging including an L-shaped member having a long leg and a foot, the distal end of said long leg being pivotable about an axis located at said distal end and transverse thereto and being substantially parallel to the plane of said slidable tray whereby said foot engages said slidable tray when said L-shaped member is pivoted by said means for pivoting, and means for sliding said means for actuating and said tray, with respect to said carrousel;

an unclamping means arranged at a second unload position along said carrousel for unclamping said at least one clamp to permit unloading of said objects from said trays;

an unloading position along said carrousel including means for verifying that said carrier is empty; and a clamping means arranged at a load position along said carrousel for actuating said at least one clamp to clamp said objects onto said trays prior to said trays being incremented to said operating positions.

2. The system of claim 1 wherein said unclamping means includes a first shaft, a first plurality of actuating lever equal in number to the number of said clamp means, and rotatable on said first shaft, said actuating levers being spaced to individually engage said clamp means upon rotation of said actuating levers, said actuating levers being oriented in an unclamping home position in the proximity of said clamps whereby said actuating levers unclamp said clamp means when said actuating levers rotate in a first direction.

3. The system of claim 2 wherein said clamping means includes a second shaft, a second plurality of actuating levers equal in number to the number of said clamp means, and rotatable on said second shaft, said second actuating levers being spaced to individually engage said clamp means upon rotation of said second actuating lever, said actuating levers being oriented in a clamping home position in the proximity of said clamps whereby said actuating levers clamp said clamp means when said second actuating lever rotate in a second direction.

4. The system of claim 1 wherein said clamping means includes a shaft, a plurality of actuating levers equal in number to the number of said clamp means, and rotatable on said shaft, said actuating levers being spaced to individually engage said clamp means upon rotation of said actuating levers, said actuating levers being oriented in a clamping home position in the proximity of said clamps whereby said actuating levers clamp said clamp means when said actuating levers rotate.

5. The system of claim 2 further including means for supporting at least one identification tag printer arranged in the proximity of said second unload position whereby objects removed from said carrousel are provided with an identification tag.

6. The system of claim 5 wherein said means for supporting includes a vertically moveable rack for supporting vertically displaced printers whereby said rack is moveable between vertical positions to locate printers at a selected vertical position.

7. The system of claim 1 further including means for supporting at least one identification tag printer arranged in the proximity of said second unload position whereby objects removed from said carrousel are provided with an identification tag.

8. The system of claim 7 wherein said means for supporting includes a vertically moveable rack for supporting vertically displaced printers whereby said rack is moveable between vertical positions to locate printers at a selected vertical position.

* * * * *

UNITED STATES PATENT AND TRADEMARK OFFICE
CERTIFICATE OF CORRECTION

PATENT NO. : 4,724,948

DATED : February 16, 1988

INVENTOR(S) : John Lee Adams & Dennis Lane Miller

It is certified that error appears in the above-identified patent and that said Letters Patent is hereby corrected as shown below:

Column 2, line 30: delete "where a probe 16, of known type, is moved inwardly toward the carrousel to verify that the carrier 11c is empty. The carrier 11 is next incremented to a load position 11d."

Signed and Sealed this

Fourth Day of October, 1988

*Attest:*

DONALD J. QUIGG

*Attesting Officer*      *Commissioner of Patents and Trademarks*